(12) United States Patent
Davis et al.

(10) Patent No.: US 6,345,102 B1
(45) Date of Patent: Feb. 5, 2002

(54) VEHICLE LOUDSPEAKERS

(75) Inventors: Gillian Margaret Davis, Huntingdon; Anthony Malcolm McDonald, Earith; Robin Meredith Courtney Pain, Swavesey; Martin James Stone, Manchester, all of (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/284,780

(22) PCT Filed: Oct. 6, 1997

(86) PCT No.: PCT/GB97/02728

§ 371 Date: Jun. 10, 1999

§ 102(e) Date: Jun. 10, 1999

(87) PCT Pub. No.: WO98/16409

PCT Pub. Date: Apr. 23, 1998

(30) Foreign Application Priority Data

Oct. 16, 1996 (GB) .............................................. 9621523

(51) Int. Cl.[7] .................................................. H04B 1/00
(52) U.S. Cl. .......................................... 381/86; 381/389
(58) Field of Search .................................... 381/86, 389

(56) References Cited

U.S. PATENT DOCUMENTS

| | | | |
|---|---|---|---|
| 4,056,696 A | 11/1977 | Meyerle et al. ......... | 179/100 R |
| 4,326,100 A | 4/1982 | Polacsek ................... | 179/1 VE |
| 4,453,047 A | * 6/1984 | Thompson | |
| 4,706,273 A | 11/1987 | Spear et al. ................... | 379/58 |
| 4,875,229 A | * 10/1989 | Palett et al. ................... | 379/58 |
| 5,442,813 A | 8/1995 | Walters ........................ | 455/89 |
| 5,810,420 A | * 9/1998 | Welling ...................... | 296/97.5 |
| 5,901,231 A | * 5/1999 | Parrella et al. ............... | 381/86 |

FOREIGN PATENT DOCUMENTS

DE  4300433 A  7/1994  .......... B60R/11/02

* cited by examiner

Primary Examiner—Forester W. Isen
Assistant Examiner—Brian Tyrone Pendleton
(74) Attorney, Agent, or Firm—Foley & Lardner

(57) ABSTRACT

A loudspeaker, for example, for an in-vehicle hands-free commnunication system or an in-vehicle entertainment system is provided as part of a vehicle sun visor (10), or as an attachment (24) to a vehicle sun visor so that the loudspeaker can be placed relatively close to the driver's ears and in front of the driver. Accordingly, there will not be any significant tendency for the driver to turn their head when listening to the loudspeaker. The loudspeaker comprises a flat panel (26) which is driven by a piezo-electric actuator (28), enabling an extremely thin construction to be realised and the loudspeaker to be conveniently integrated into the sun visor, or provided as an unobtrusive attachment for the sun visor.

15 Claims, 4 Drawing Sheets

VEHICLE LOUDSPEAKERS

This invention relates to vehicle loudspeakers, which may be used, for example, in in-vehicle hands-free communication systems such as telephone systems, and which may also be used in in-vehicle entertainment systems.

One disadvantage of an in-vehicle hands-free telephone system which uses conventional loudspeakers is that the microphone and loudspeaker need to be, or are typically, widely separated. Typically, the microphone is attached to the windscreen pillar so as to be relatively close to the driver's mouth, whilst the loudspeaker is placed in the foot-well on the passenger side, i.e. on the other side of the driver to the microphone. This can cause an unwanted strain in a telephone conversation, because it is instinctive for the driver to turn towards the sound source, i.e. the foot-well loudspeaker, and away from the microphone. This therefore reduces the signal-to-noise ratio at the microphone and consequently reduces the conversation quality. Also, the driver may be distracted from looking straight forward, thus reducing the overall safety of the vehicle and its occupants.

In accordance with a first aspect of the present invention, there is provided an attachment for a vehicle sun visor, the attachment being characterised by: a panel which can be vibrated to generate sound; a piezo-electric actuator coupled to the panel and operable to vibrate the panel in response to a driving signal so as to act as a loudspeaker; and means for attaching the panel to the sun visor.

In accordance with a second aspect of the present invention, there is provided a sun visor for a vehicle, comprising: a panel; and means for attaching the panel to the vehicle adjacent an upper edge of a windscreen of the vehicle; characterized in that: the panel is vibratable to generate sound; and a piezo-electric actuator is coupled to the panel and is operable to vibrate the panel in response to a driving signal so as to act as a loudspeaker.

By providing the loudspeaker as part of a vehicle sun visor, or as an attachment to a vehicle sun visor, the loudspeaker can be placed relatively close to the driver's ears and in front of the driver. Accordingly, there will not be any significant tendency for the driver to turn their head when listening to the loudspeaker. Also, by using a panel, such as a flat panel, which is driven by a piezo-electric actuator, as the loudspeaker, an extremely thin construction can be realised, and the loudspeaker can conveniently be integrated into a sun visor, or be provided as an unobtrusive attachment for a sun visor, in such a way that there is little likelihood of the sun visor or attachment causing any greater injury to the driver in the event of an accident than a conventional sun visor.

In one embodiment of the first aspect of the invention, the attaching means is arranged to one side of the panel for attaching the panel to the vehicle sun visor with said one side of the panel facing the sun visor.

In another embodiment of the first aspect of the invention, the attaching means comprises: a second panel hinged to the first-mentioned panel; and means for biasing the panels towards each other so that they can grip the vehicle sun visor therebetween. In this case, the attachment may further include a second piezo-electric actuator coupled to the second panel and operable to vibrate the second panel in response to the, or a further, driving signal so as to act as a second loudspeaker.

The sun visor of the second aspect of the invention may further include a second panel generally parallel to the first-mentioned panel; the first-mentioned piezo-electric actuator, or a second piezo-electric actuator, being coupled to the second panel and operable to vibrate the second panel in response to the, or a further, driving signal so as to act as a second loudspeaker.

In the case where the attachment or the vehicle sun visor has two loudspeakers, the first-mentioned loudspeaker and the second loudspeaker may have substantially different frequency response characteristics. Accordingly, the two loudspeakers can be designed to provide a better overall frequency response.

The attachment or vehicle sun visor may further include a microphone.

In accordance with a third aspect of the present invention, there is provided a vehicle hands-free telephone system having a loudspeaker and a microphone, characterized in that the loudspeaker is provided by a vehicle sun visor attachment, or a vehicle sun visor, according to the first or second aspect of the invention.

The microphone of the telephone system is preferably provided by the mnicrophone of the attachment or sun visor.

In accordance with a fourth aspect of the present invention, there is provided a vehicle having at least one of: (a) a sun visor, and an attachment therefor according to the first aspect of the invention; (b) a sun visor according to the second aspect of the invention; and (c) a telephone system according to the third aspect of the invention.

Specific embodiments of the present invention will now be described, purely by way of example, with reference to the'accompanying drawings, in which.

Figure 1:
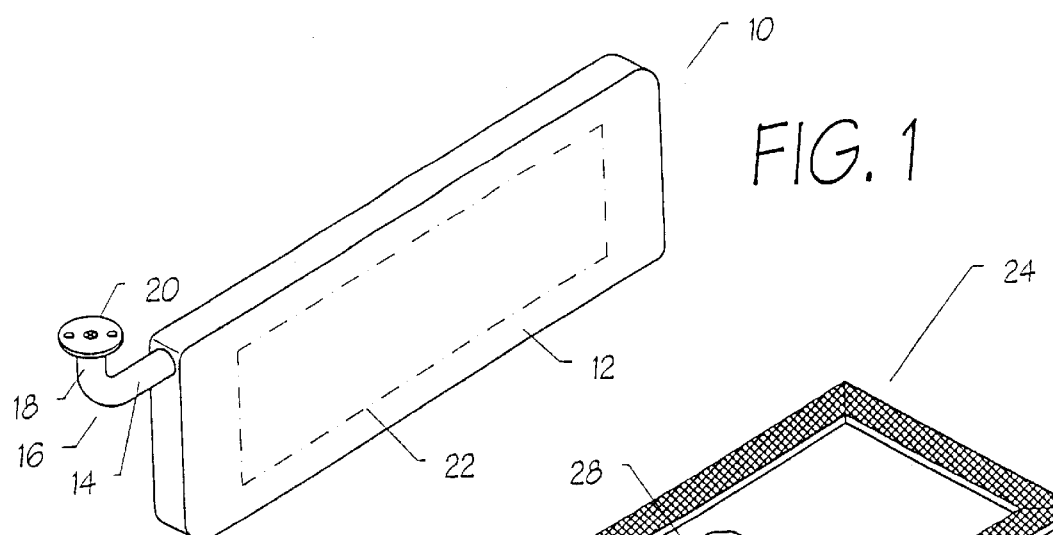
FIG. 1 is an isometric view of a conventional vehicle sun visor.
Figure 3:
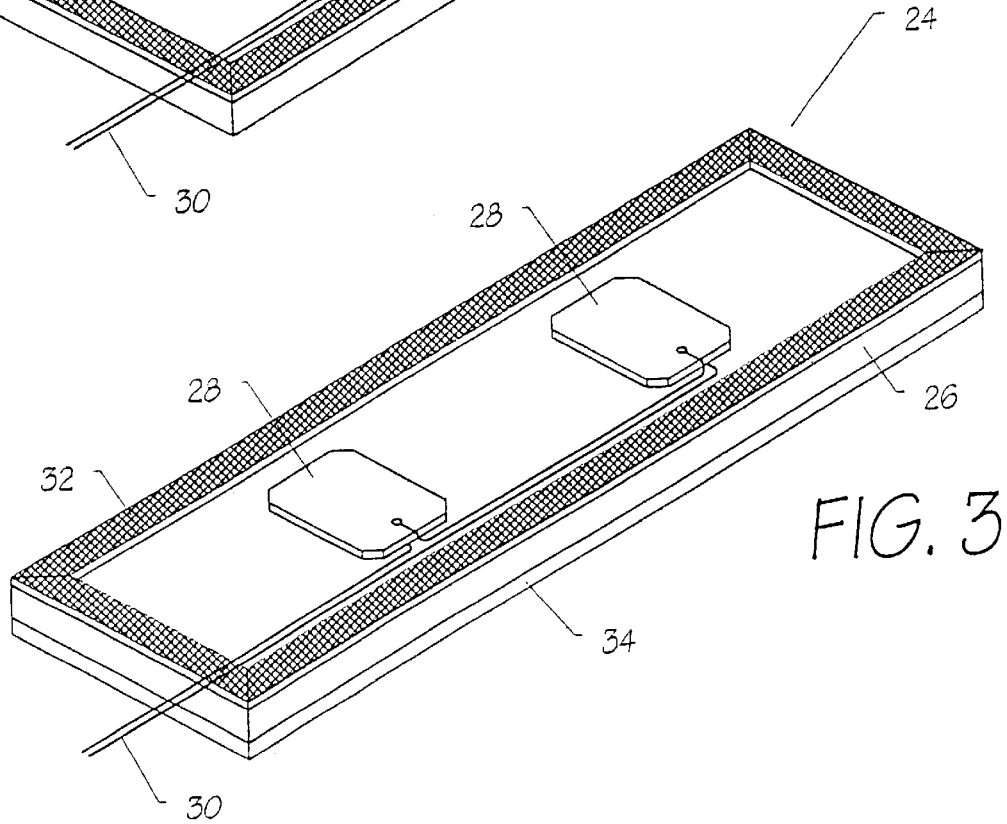
FIG. 3 is an isometric view, from one corner and behind, of a vehicle sun visor attachment of a second embodiment of the invention.
Figure 4:
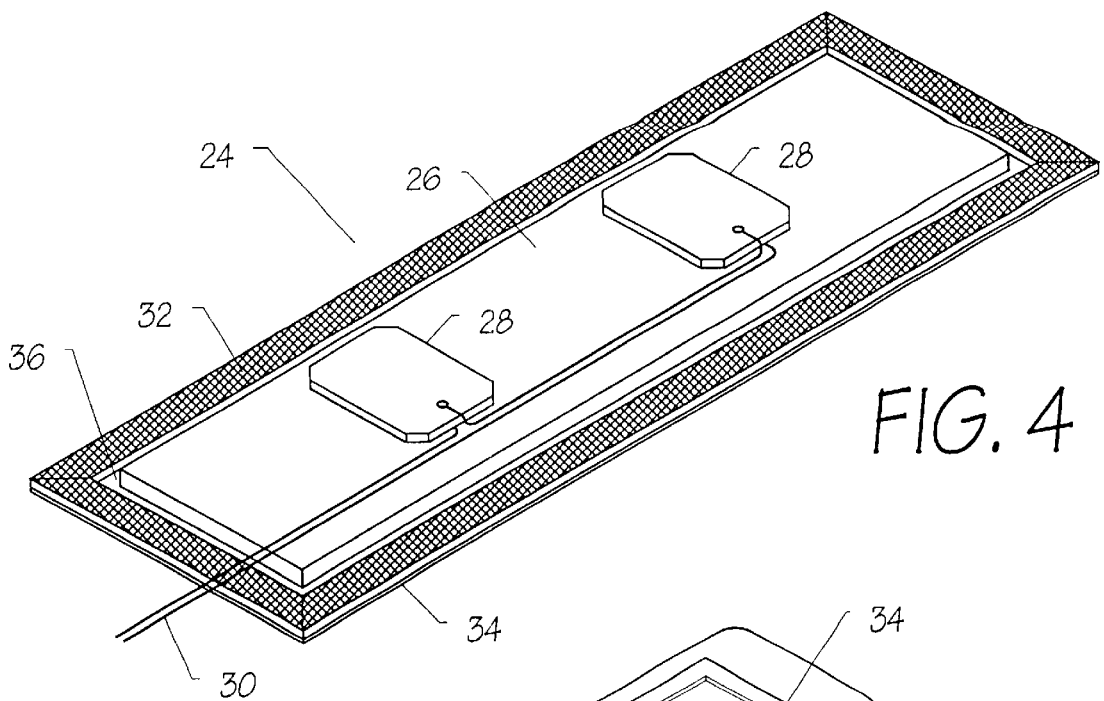
FIG. 4 is an isometric view, from one corner and behind, of a vehicle sun visor attachment of a third embodiment of the invention.

Referring to FIG. 1, a conventional vehicle sun visor 10 comprises a rectangular panel 12 which is hinged adjacent and along one of its longer edges to an arm 14 of a crank 16. The other arm 18 of the crank 16 can rotate relative to a mounting plate 20, by which the sun visor 10 can be attached to a motor vehicle adjacent an upper edge of the vehicle windscreen. The attachments shown in FIGS. 2 to 4 are intended to be secured to one side of the panel 12 of the sun visor 10 in the region denoted by the dot-dash line 22 in FIG. 1.

Figure 2:
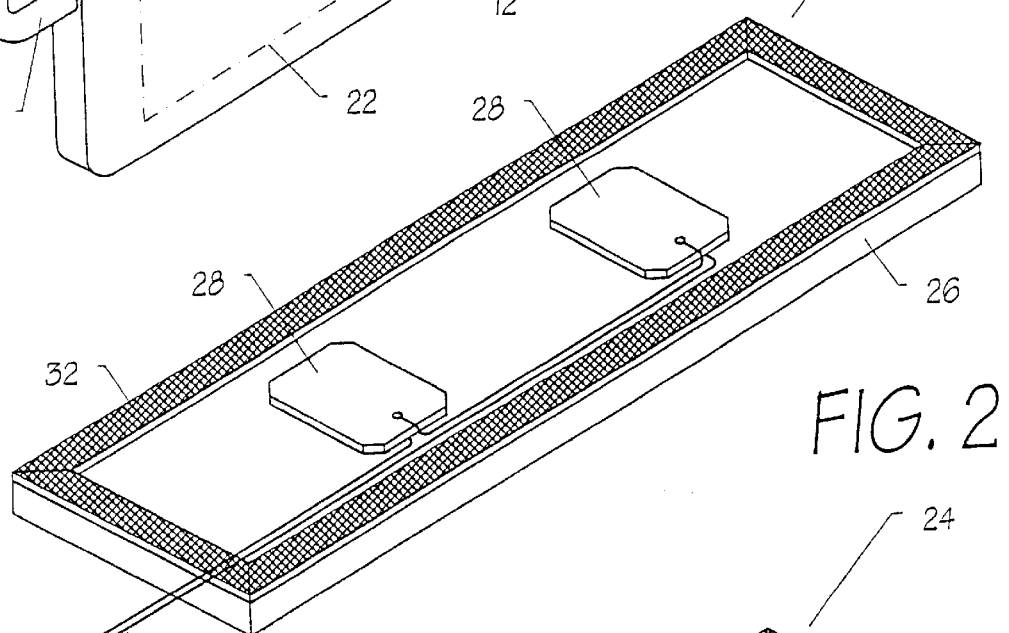
FIG. 2 is an isometric view, on a larger scale and from one corner and behind, of a vehicle sun visor attachment of a first embodiment of the invention.

Referring now to FIG. 2, the first embodiment of a loudspeaker attachment 24 for the sun visor 10 of FIG. 1 comprises a rectangular panel 26 formed from a sheet of, for example, aluminium, hardboard or plastics material, or from a composite of two thin sheets of such material between which a honeycomb- or foam-like material is sandwiched. A piezo-electric actuator is mounted on the rear face of the panel 26, and in the embodiment shown comprises two elements 28, each comprising a layer of piezo-electric material sandwiched between a pair of electrode layers, which are adhered to the rear face of the panel 26. The piezo-electric elements 28 are connected together, either in series or in parallel, by wires 30. When a driving signal is applied to the wires 30, the piezoelectric elements 28 cause the panel 26 to vibrate and thus to act as a loudspeaker.

Fixing material 32 is provided around the marginal edge of the rear face of the panel 26, by which the loudspeaker attachment 24 can be attached to the sun visor 10 in the region 22. The fixing material 32 may be, for example, double-sided releasable adhesive tape, hook-and-loop tape (such as Velcro®) or magnetic tape. In the latter two examples, complementary tape is applied to the sun visor 10. The manner of fixing the loudspeaker attachment 24 to the sun visor 10 is preferably releasable, as in the examples given above, so that the loudspeaker attachment 24 can be removed from the vehicle if and when required.

It should be understood that the loudspeaker attachment 24 can be attached to either side of the sun visor 10. It will be noted that the panel 26 is fixed to the sun visor 10 with the side of the panel 26 which bears the piezo-electric elements 28 facing the sun visor 10. Accordingly, the piezo-electric elements 28 are hidden. This has aesthetic advantages, together with providing added protection against accidental electric shock from the relatively high voltages used to drive the piezo-electric elements 28.

Referring now to FIG. 3, the second embodiment is similar to the first embodiment of FIG. 2, except that a layer 34 of acoustic absorbing material is applied to the front face of the panel 26. Depending on the side by which the panel 26 is attached, the acoustic absorbing material could be provided by the sun visor itself. For certain applications, such as hands-free in-car telephone systems, the high frequency components which can be generated by the flat panel loudspeaker 24 are not desirable, and the acoustic absorbing layer 34 is used to absorb the high frequencies and therefore improve the perceived quality of sound generated by the loudspeaker 24. Instead of, or in addition to, using such an acoustic absorbing layer 34, electrical filtering may be employed.

Figure 5:
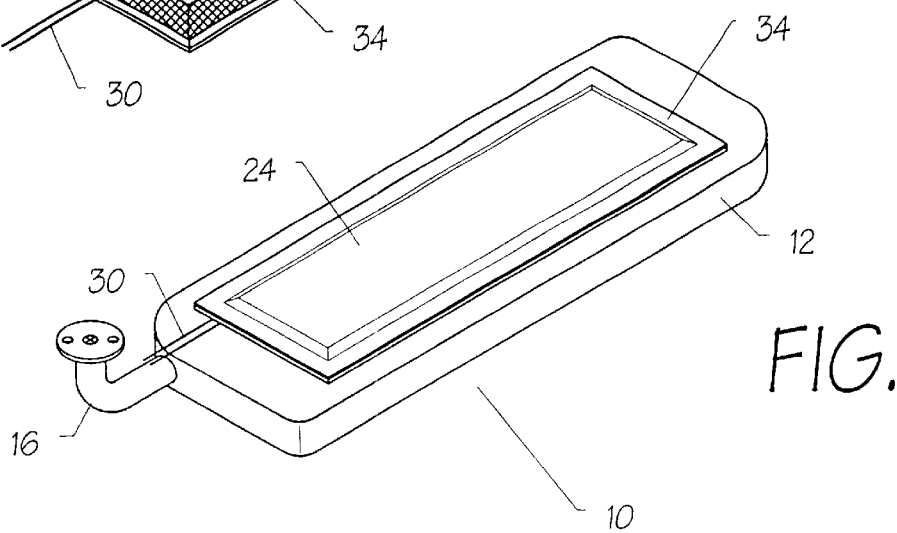
FIG. 5 is an isometric view, on a smaller scale and from one corner and in front, of the vehicle sun visor attachment of FIG. 4 secured to a vehicle sun visor.

Referring now to FIG. 4, the third embodiment is similar to the second embodiment of FIG. 3, except in the following respect. The covering layer 34, which may or may not be of acoustic absorbing material, extends beyond the edges of the panel 26, and the fixing material 32 is secured to the marginal edge of the rear surface of the covering layer 34, with a gap 36 between the inner edge of the fixing material 32 and the outer edge of the panel 26. The material of the covering layer 34 is slightly stretchable. Therefore, as shown in FIG. 5, when the loudspeaker attachment 24 is applied to the sun visor 10, the marginal page of the covering layer 34 can be stretched so that the fixing material 32 can be secured to the panel 12 of the sun visor 10. The covering layer 34 need not be secured to the panel 12 of the sun visor 10 along all four edges, and, if secured along only two or three edges, then a pocket can be formed between the panel 26 of the loudspeaker attachment 24 and the panel 12 of the sun visor 10, into which other articles can be inserted. It has been found that the frequency response usually improves if the covering layer 34 is stretched tight.

Figure 6:
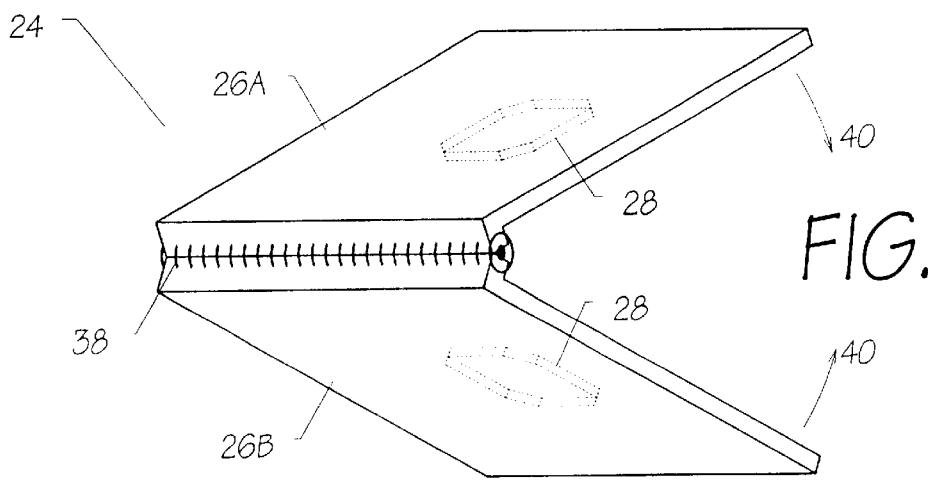
FIG. 6 is an isometric view of a vehicle sun visor attachment of a fourth embodiment of the invention.
Figure 7:
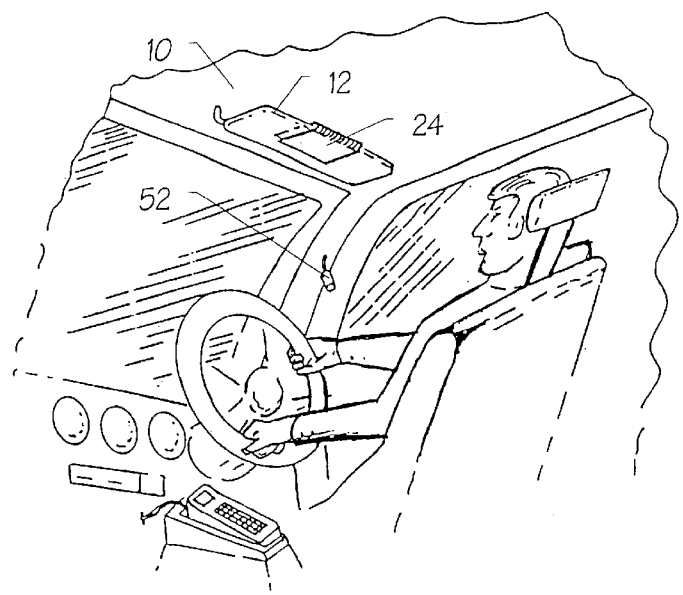
FIG. 7 is a view of the cockpit of a motor vehicle, with the vehicle sun visor attachment of FIG. 6 secured to a sun visor of the vehicle.

Referring now to FIG. 6, the loudspeaker attachment 24 of the fourth embodiment comprises a pair of the panels 26A,26B, which are hinged to each other along an edge of each of the panels 26A,26B, and a spring 38 urges the panels 26A,26B together in the direction denoted by the arrows 40. Between the two panels 26A,26B, a respective one of the piezo-electric elements 28 is secured to each of the panels 26A,26B, and the piezo-electric elements 28 are connected together by wires (not shown) in a similar fashion to that described above with reference to FIGS. 2 to 4. Accordingly, as shown in FIG. 7, the loudspeaker attachment 24 forms a clip by which it can hold itself to a conventional sun visor 10, with the panel 12 of the sun visor 10 gripped between the spring-loaded panels 26A,26B of the loudspeaker attachment 24.

In the embodiments described above with reference to FIGS. 2 to 6, a thin electrical protection film layer may be applied to the rear face of the loudspeaker attachment 24, and this may have the dual function of providing added protection against electrical shock as well as modifying and potentially smoothing the frequency response of the panel.

Figure 8:
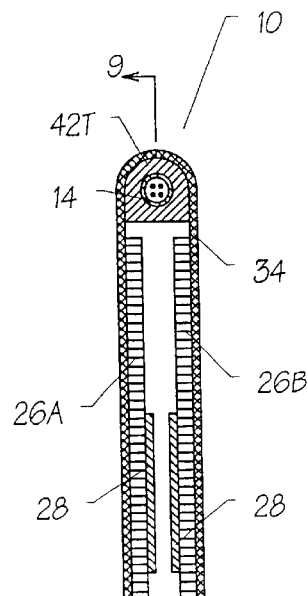
FIG. 8 is an end view of a vehicle sun visor of a fifth embodiment of the invention, cross-sectioned on a section plane 8—8 shown in FIG. 9.
Figure 9:
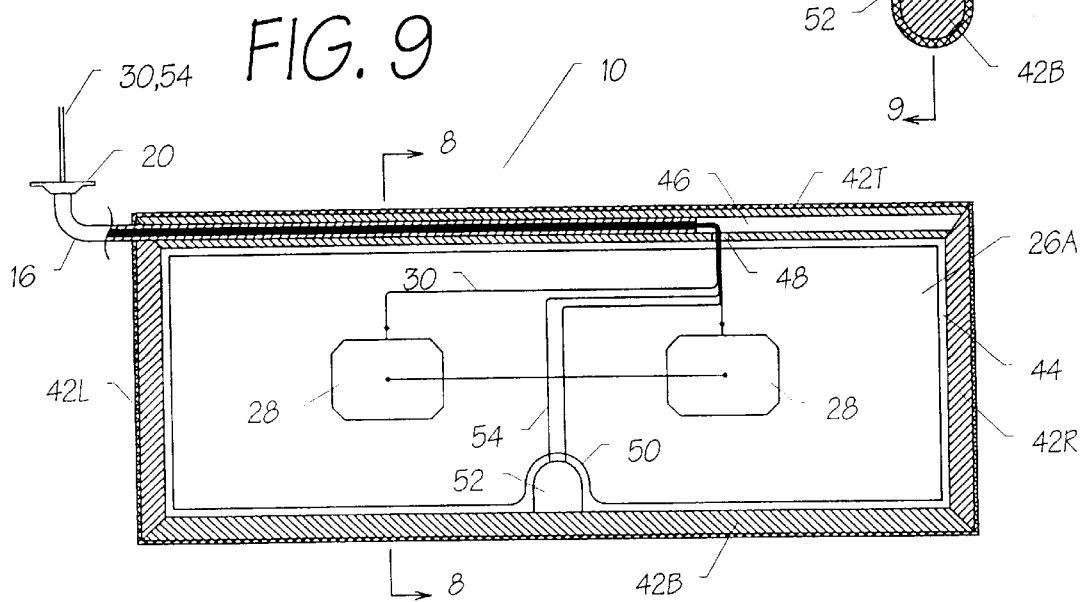
FIG. 9 is a view on a smaller scale of the sun visor of FIG. 8, cross-sectioned on a section plane 9—9 shown in FIG. 8.

Referring now to FIGS. 8 and 9, an embodiment is shown in which the loudspeaker function is provided integrally in the sun visor 10 and which differs from the embodiments described above in the following respects. The sun visor 10 comprises a rectangular frame 42 having, as seen in FIG. 9, a top limb 42T, a bottom limb 42B, and left and right limbs 42L,42R, which may be integrally formed or assembled from components. Two of the rectangular panels 26A,26B are positioned within the frame 42, with a gap 44 between the peripheries of the panels 26A,26B and the inside edge of the frame 42. The frame 42 and the panels 26A,26B are enveloped with a layer 34, which may or may not be of the acoustic absorbing material mentioned above, and which is adhered to the frame 42 and the outwardly-facing faces of the panels 26A,26B. The panels 26A,26B are held generally parallel and spaced apart.

The top limb 42T of the frame has a bore 46 extending at least part way along its length 20 from one end, and the crank 16 is tubular and its arm 14 is a sliding friction fit in the bore 46 so that the sun visor 10 can be pivoted up and down. Two of the piezo-electric elements 28 are secured to the inwardly-facing faces of each panel 26A,26B, and the four piezo-electric elements 28 are connected together in series and/or parallel by wires 30 which pass through an aperture 48 in the top limb 42T and through the tubular crank 16 so as to exit therefrom at the end connected to the mounting plate 20. A pair of notches 50 are formed halfway along the lower edges of the panels 26A,26B to accommodate a microphone 52 which is secured to the bottom limb 42B of the frame. Wires 54 for the microphone also pass through the aperture 48 in the top limb 42T of the frame and along the tubular crank 16.

Figure 10:
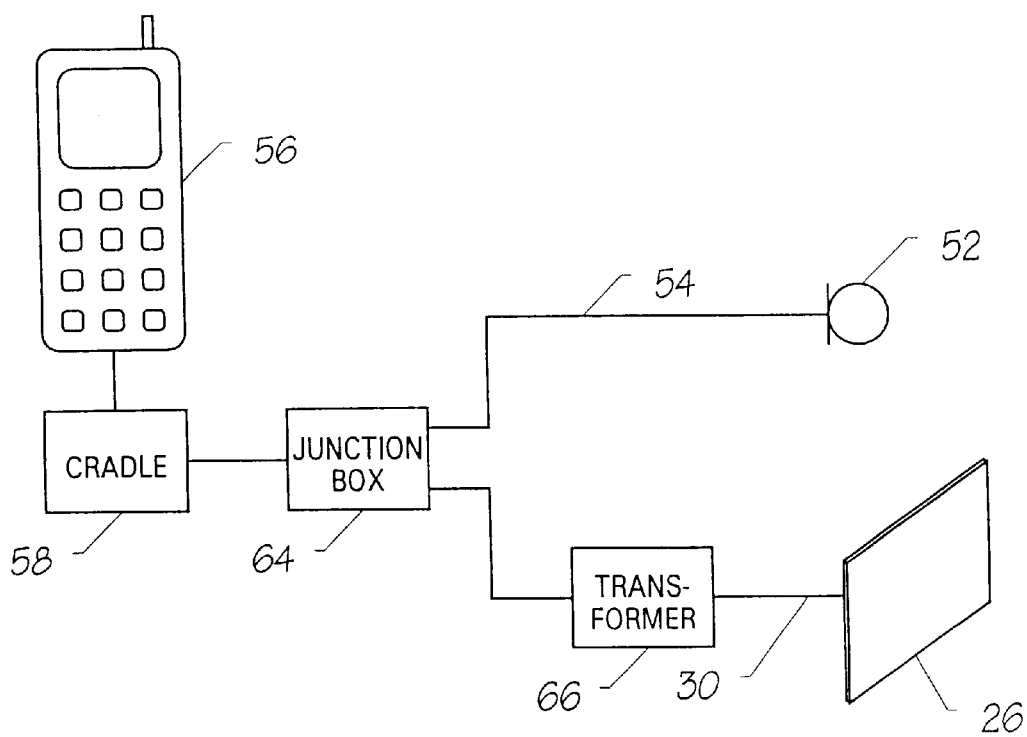
FIG. 10 is a block diagram of an in-car hands-free telephone system which may employ a sun visor, or sun visor attachment, of any of the first to fifth embodiments of the invention.

Referring now to FIG. 10, a hands-free in-car telephone system comprises a handset 56 which is releasably connected to a cradle 58. Audio signals are input to the handset 56 from a microphone 52 (see also FIG. 7) via wires 54, a junction box 64 and the cradle 58. Audio signals are output from the handset 56 via the cradle 58 and the junction box 64. In a conventional such system, the audio signals from the junction box 64 would be output to a conventional loudspeaker, such as a moving-coil loudspeaker. However, rather than this, the output signals supplied to the piezo-electric element(s) 28 of the flat panel loudspeakers described above with reference to FIGS. 2 to 9, via a step-up transformer 66. The transformer 66 increases the voltage of the signals output from the junction box 64 to a voltage suitable for driving the piezo-electric element(s) 28 of the flat panel loudspeakers. The transformer 66 might typically have a 10:1 step-up ratio. As an addition or an alternative to the transformer 66, a high-voltage amplifier may be used, the transformer 66 merely being an example of a technique to match the electrical requirement of a typical piezo-electric element with the electrical output of a typical hands-free telephone system. Alternatively, the junction box 64 could be re-engineered. In the case where the sun visor 10 of FIGS. 8 and 9 is employed in the system of FIG. 10,the microphone 52 provided in the sun visor 10 of FIGS. 8 and 9 may constitute the microphone 52 shown in FIG. 10. Accordingly, a hands-free in-car telephone system is provided in which not only is the microphone positioned conveniently for the driver and so as to provide a high signal-to-noise ratio, but also the loudspeaker is positioned unobtrusively close to the driver so that the driver can more naturally use the system.

It should be noted that the embodiments of the invention have been described above purely by way of example, and that many modifications and developments may be made to them.

For example, the sun visor attachments 24 of FIGS. 2 to 6 may also be provided with microphones 52.

Also, the number of piezo-electric elements 28 provided on each panel 26; 26A,26B may be other than two, for example one, three or four. The piezo-electric elements 28 on each panel 26; 26A,26B may have different characteristics or be coupled to the panel differently, so that each produces a different frequency response characteristic so that the overall frequency response characteristic of the panel is more uniform.

Furthermore, the sun visor attachments 24 described with reference to FIGS. 2 to 4 may be provided in pairs, for attachment to either side of the panel 12 of the sun visor 10. In this case, or in the case of the embodiments described with reference to FIGS. 6 to 9, the panels of each pair may have different frequency response characteristics so that the overall frequency response characteristic of the pair of panels is more uniform. Moreover, in the case of the embodiments of FIGS. 6 to 9, the piezoelectric element(s) may be provided on only one of the panels 26A,26B.

Further, in the embodiment described with reference to FIGS. 8 and 9, the piezo-electric elements 28 may bridge the space between the panels 26A,26B, so that each piezo-electric element 28 is directly coupled to both of the panels 26A,26B.

Also, the flat panel loudspeakers described above need not necessarily be used as part of a telephone system. Additionally or alternatively, they may be used in in-car entertainment systems o replace, or as an addition to, the conventional front loudspeakers. In this case, the driver's and front seat passenger's sun visors or attachments to them may be fed with left and right channels of a stereo signal. Even in the case of a telephone system, both the driver's and front seat passenger's sun visors may be provided with loudspeakers to facilitate the passenger listening to a telephone conversation.

Many other modifications and developments may also be made to the invention.

What is claimed is:

1. A loudspeaker unit for a vehicle, comprising:
    a piezo-electric loudspeaker comprising:
        a panel with first and second faces facing in opposite directions; and
        a piezo-electric actuator coupled to a first face of the panel and operable to vibrate the panel in response to a driving signal so as to radiate sound from the first face of the panel and thus act as a loudspeaker; and
    means for attaching the piezo-electric loudspeaker to the vehicle, wherein the means for attaching is arranged to releasably attach the panel to a sun visor of the vehicle with the second face of the panel facing a face of the sun visor.

2. The loudspeaker unit of claim 1, further comprising a microphone.

3. The loudspeaker unit of claim 1, wherein the attaching means is arranged to second face of the panel.

4. The loudspeaker unit of claim 1,wherein the attaching means comprises:
    a second panel hinged to the first-mentioned panel; and
    means for biasing the first-mentioned panel and the second panel toward each other so as to be operable to grip the sun visor therebetween.

5. The loudspeaker unit of claim 4, wherein the second panel has first and second faces facing in opposite directions and the second panel is hinged to the first panel and the biasing means is arranged as to be operable to grip the sun visor between the second faces of the first and second panels, and further comprising:
    a second piezo-electric actuator coupled to the first face of the second panel and operable to vibrate the second panel in response to the, or a further, driving signal so as to act as a second loudspeaker by radiating sound from the first face of the second panel and.

6. The loudspeaker unit of claim 5, wherein the first-mentioned loudspeaker and the second loudspeaker have substantially different frequency response characteristics.

7. A loudspeaker unit for a vehicle, comprising:
    a panel having first and second faces facing in opposite directions and vibratable to generate sound from one of first and second faces of the panel; and
    means for attaching the panel to the vehicle adjacent an upper edge of a windscreen of the vehicle to form a sun visor of the vehicle; and
    a piezo-electric actuator coupled to the first face of the panel and operable to vibrate the panel in response to a driving signal so as to act as a loudspeaker bv radiating sound from the first face of the panel.

8. The loudspeaker unit of claim 7, further comprising a second panel generally parallel to the first-mentioned panel and having first and second faces facing in opposite directions, with the second faces of the first and second panels facing towards each other; a second piezo-electric actuator coupled to a first face of the second panel and operable to vibrate the second panel in response to the, or a further, driving signal so as to radiate sound from the first face of the second panel and act as a second loudspeaker.

9. The loudspeaker unit of claim 8, wherein the first-mentioned loudspeaker and the second loudspeaker have substantially different frequency response characteristics.

10.The loudspeaker unit of claim 7, further comprising a microphone.

11. A vehicle hands-free telephone system, comprising:
    a loudspeaker unit for a vehicle, comprising:
        a panel having first and second faces facing in opposite directions and vibratable to generate sound from one of the first and second faces; and
        means for attaching the panel to the vehicle adjacent an upper edge of a windscreen of the vehicle to form a sun visor of the vehicle;

a piezo-electric actuator coupled to the first face of the panel and operable to vibrate the panel in response to a driving signal so as to act as a loudspeaker by vibrating sound from the first face of the panel; and a microphone operably coupled to the loudspeaker unit and the piezo-electric actuator.

12. The system of claim 11,wherein the microphone of the telephone system is a microphone of the loudspeaker unit.

13. A vehicle hands-free telephone system, comprising:

a piezo-electric loudspeaker comprising:

a panel with first and second faces facing in opposite directions; and a piezo-electric actuator coupled to the first face of the panel and operable to vibrate the panel in response to a driving signal so as to radiate sound from the first face of the panel and thus act as a loudspeaker; and means for attaching the piezo-electric loudspeaker to the vehicle, wherein the means for attaching is arranged to releasably attach the panel to a sun visor of the vehicle with the second face of the panel facing a face of the sun visor; and a microphone operably coupled to the loudspeaker unit and the piezo-electric actuator.

14. The system of claim 13, wherein the microphone of the telephone system is a microphone of the piezo-electric loudspeaker.

15. A vehicle having a loudspeaker unit, comprising:

a panel having first and second faces facing in opposite directions and vibratable to generate sound from one of the first and second faces; and means for attaching the panel to the vehicle adjacent an upper edge of a windscreen of the vehicle to form a sun visor of the vehicle; and a piezo-electric actuator coupled to the first face of the panel and operable to vibrate the panel in response to a driving signal so as to act as a loudspeaker by radiating sound from the first face of the panel.

\* \* \* \* \*